United States Patent
Collier et al.

(10) Patent No.: US 7,092,853 B2
(45) Date of Patent: Aug. 15, 2006

(54) ENVIRONMENTAL NOISE MONITORING SYSTEM

(75) Inventors: Robert D. Collier, Lebanon, NH (US); Douglas A. Fraser, Meriden, NH (US); Kenneth Kaliski, Thetford, VT (US); G. Ayorkor Mills-Tettey, Hanover, NH (US); Efrosyni Seitaridou, Northampton, MA (US)

(73) Assignee: The Trustees of Dartmouth College, Hanover, NH (US)

( * ) Notice: Subject to any disclaimer, the term of this patent is extended or adjusted under 35 U.S.C. 154(b) by 503 days.

(21) Appl. No.: 10/280,565

(22) Filed: Oct. 25, 2002

(65) Prior Publication Data

US 2003/0204381 A1    Oct. 30, 2003

Related U.S. Application Data

(60) Provisional application No. 60/335,675, filed on Oct. 25, 2001.

(51) Int. Cl.
    *G06F 7/40* (2006.01)
(52) U.S. Cl. .................. 702/195; 702/182; 702/183; 702/190
(58) Field of Classification Search .............. 702/73, 702/85, 116, 182, 183, 190, 195; 73/646; 370/310; 709/224
    See application file for complete search history.

(56) References Cited

U.S. PATENT DOCUMENTS

| 5,730,146 | A  | * | 3/1998 | Itil et al. ................... 600/545 |
| 6,098,463 | A  | * | 8/2000 | Goldberg ..................... 73/646 |
| 6,194,793 | B1 | * | 2/2001 | Fisher, Jr. .................... 307/66 |
| 6,567,006 | B1 | * | 5/2003 | Lander et al. ............... 340/605 |

OTHER PUBLICATIONS

Casella USA, Cel-400 Series Classic Sound Level Meters, Jun. 24, 2005, Casella USA, 2 pages.*
Casella USA, Dust Heat Noise Weather, Jun. 24, 2005, Casella USA, 4 pages.*
CEL Instruments Ltd., CEL Main Instrument Cataloge page, Jun. 24, 2004, 3 pages.*
Casella CEL UK-CEL-553, Real time third octave analyser (Type 1), Casellacel, 4 pages.*
CEL-440 and 480 Sound Level Meter, Product Information- CEL-440 & 480 Integrating Sound Level Meters, Jun. 24, 2005, 8 pages.*

* cited by examiner

*Primary Examiner*—Marc S. Hoff
*Assistant Examiner*—Felix Suarez
(74) *Attorney, Agent, or Firm*—Lathrop & Gage LC

(57) ABSTRACT

A continuous environmental noise level recording and analysis system is provided. The system is capable of sampling, processing and storing Equivalent Sound Level values over a period of about two weeks. The recorded data is downloaded and analyzed to show graphs, and to automatically detect noise events of interest. The measurement system conforms to ANSI/IEC Type I or Type II standards for noise level monitoring

19 Claims, 6 Drawing Sheets

ENVIRONMENTAL NOISE MONITORING SYSTEM

RELATED APPLICATIONS

This patent application claims priority to U.S. Provisional Patent Application Ser. No. 60/335,675, entitled "LOW COMPLEXITY, SELF-POWERED, CONTINUOUS ENVIRONMENTAL NOISE MONITORING SYSTEM FOR COMMUNITIES, AIRPORTS AND REMOTE AREAS", filed Oct. 25, 2001 and hereby incorporated by reference to the extent as though fully replicated herein.

FIELD OF THE INVENTION

The present invention relates to the field of remote environmental noise monitoring.

BACKGROUND OF THE INVENTION

For airports and communities, it is useful to conduct medium-term (one to two week) continuous measurements of sound levels. At the present time, there are no sound level meters or systems that can do this type of monitoring at costs that are affordable for small regional airports and smaller communities. Existing monitors of this type cost in excess of $10,000, and are so complicated that only professional noise consultants can use them.

SUMMARY OF THE INVENTION

Systems and methods herein provide for continuous measuring and recording of sound levels over the course of a one to two week period, in accordance with national and international noise measurement standards. In one aspect, a system has a remote power supply unit to power the system, a microphone to convert the sound source to an electrical signal, an analog circuit to condition the signal, a digital circuit to digitize, process and store the information, and an interface to transfer the stored data to an analysis unit. The analysis unit may be accessed and/or used for further statistical analysis and automatic noise event detection.

One method of monitoring environmental noise levels includes of detecting and converting sound waves into two identical analog electrical signals. The first signal is filtered to leave only A-weighted information. A new signal is then generated representing an envelope of the A-weighted information. The second signal is filtered to leave only C-weighted information; and another signal is generated representing an envelope of the C-weighted information. Logarithmic amplifiers compress the envelope signals into a range that is suitable for digitization. An analog-to-digital converter is used to convert the logarithmic signals into digital data. A processor calculates 1-second Leq values and exponential averages of the Leq values from the digital data. The processor may also calculate maximum, minimum, $\frac{1}{10}$th percentile, $\frac{1}{50}$th percentile, and $\frac{1}{90}$th percentile statistical information from the Leq values. Leq values and statistical information may be stored in non-volatile memory. The method may further include steps of transferring the stored data from the non-volatile memory to a noise analysis unit. The noise analysis unit may display the transferred data in graphical form. The noise analysis unit may also process the transferred data to produce statistical information and/or detect noise events.

DETAILED DESCRIPTION OF THE PREFERRED EMBODIMENTS

Figure 1:
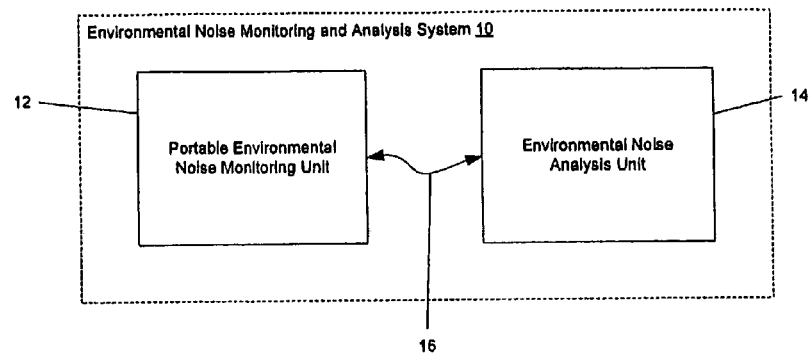
FIG. 1 is a block diagram illustrating one system for capturing and analyzing environmental noise.

FIG. 1 is a block diagram showing one environmental noise monitoring and analysis system 10. System 10 includes a portable environmental noise monitoring unit 12 and an environmental noise analysis unit 14, connected together by a communication path 16. Monitoring unit 12 is ideally a weatherproof, self-contained, shock resistant, easy to operate unit and may be deployed in an environment to continuously record equivalent sound level ("Leq") data for a period of about two weeks. Monitoring unit 12 may be connected to analysis unit 14 using communication path 16 for transfer of recorded Leq data. Analysis unit 14 includes a processor (e.g., within a workstation) running noise analysis software capable of displaying the data graphically, performing statistical analysis on the data, and recognizing individual sound sources and their characteristics in the data.

Figure 2:
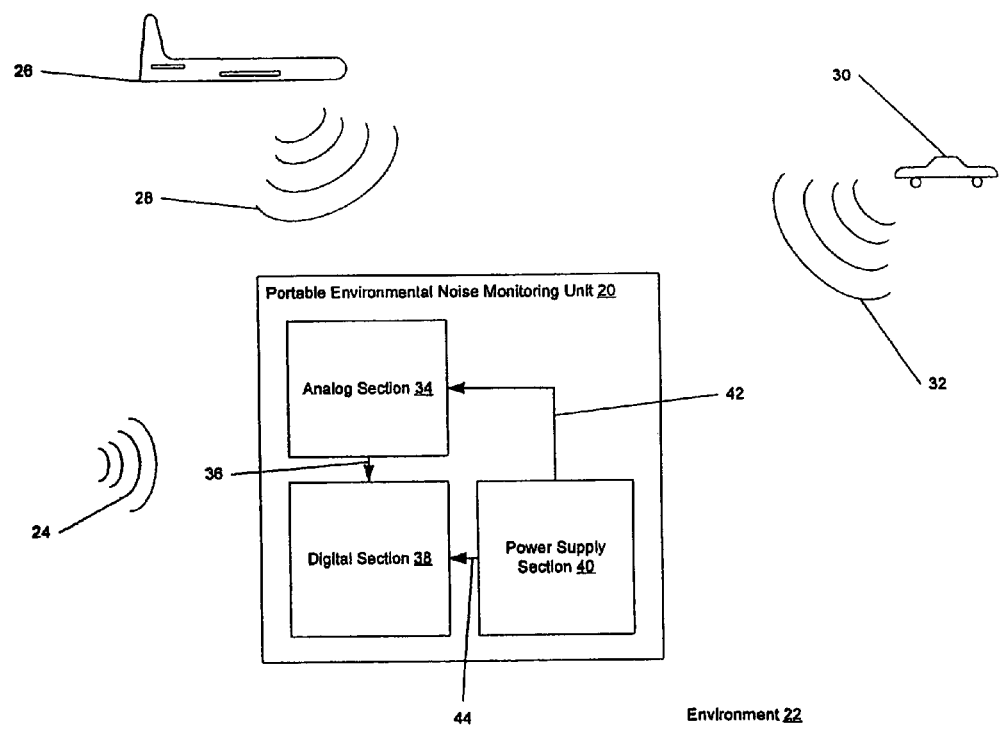
FIG. 2 illustrates one monitoring unit [12 FIG. 1] in use within an environment.

FIG. 2 illustrates a portable environmental noise monitoring unit 20 in environment 22. Sound waves 24 represent background sounds in environment 22. Aircraft 26 flying through environment 22 generates aircraft sounds 28, and vehicle 30 traveling through environment 22 generates vehicle sounds 32.

Analog section 34 of monitoring unit 20 converts sound waves 24, 28, and 32 into electrical signals 36. Digital section 38 digitizes, processes and records electrical signals 36. Analog section 34 and digital section 38 are powered by power supply section 40 via power connectors 42 and 44, respectively. Monitoring unit 20 is described in more detail in FIG. 3.

Figure 3:
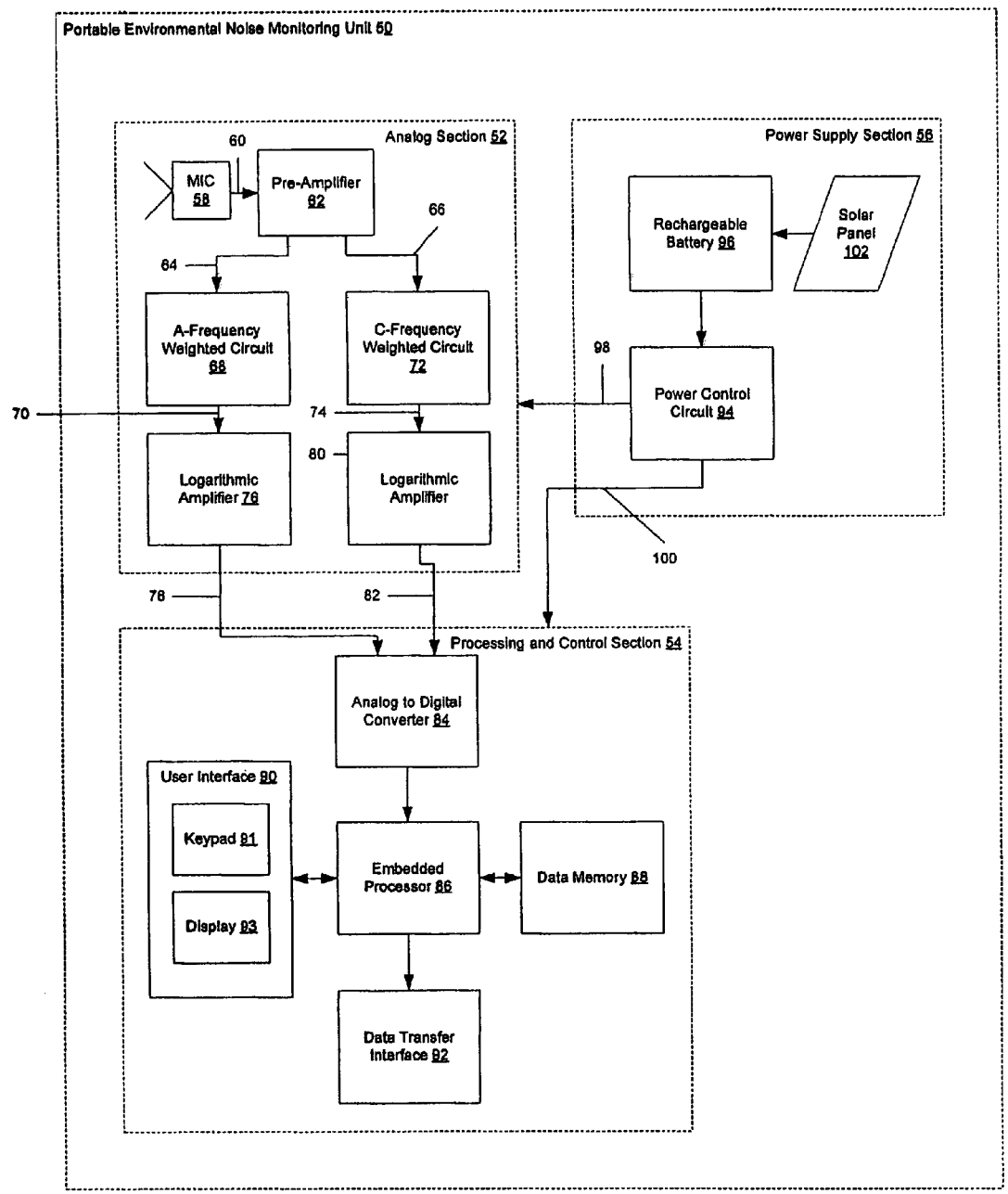
FIG. 3 is a block diagram illustrating further details of one monitoring unit.

FIG. 3 is a block diagram illustrating one monitoring unit 50. Monitoring unit 50 has three main sections: analog section 52, processing and control section 54, and power supply section 56.

Analog section 52 includes microphone 58 that converts sound waves (e.g., sound 28 of FIG. 2) into analog electrical signal 60. Pre-amplifier 62 conditions and splits signal 60 into two identical signals 64 and 66. ANSI/IEC defines standards for both Type I and Type II microphone selection, including two frequency bands of interest, A and C. A-frequency weighted circuit 68 filters signal 64 to leave only the A-frequency information of signal 64 and produces DC output signal 70 representative of an envelope of the filtered signal. C-frequency weighted circuit 72 filters signal 66 to leave only the C-frequency information of signal 66 and produces DC output signal 74 representative of an envelope of the filtered signal.

Logarithmic amplifier 76 compresses signal 70 into signal 78 that has a range suitable for digitization. Logarithmic amplifier 80 compresses signal 74 into signal 82 that has a range suitable for digitization. Signals 78 and 82 are fed into analog-to-digital converter 84 of processing and control section 54.

Processing and control section 54 contains embedded processor 86. Processor 86 uses analog-to-digital converter 84 to digitize signals 78 and 82. Processor 86 calculates 1-second Leq values with either fast or slow user selectable weighting for each signal. Processor 86 performs statistical calculations on the 1-second Leq values to produce exponential time response sound levels, and, based on these levels, determines hourly Lmax, Lmin, L10, L50 and L90 sound levels (maximum, minimum, 10th, 50th and 90th percentile sound levels respectively).

Processor 86 may record the 1-second Leq data and hourly statistical data for each frequency band (A, C) in non-volatile data memory 88.

Processing and control section 54 may contain user interface 90 that includes a keypad 91 and a display 93. Processor 86 reads user input from keypad 91 and may display user selected information screens on display 93. Display 93 may be used to show current measurements and statistical information.

Processing and control section 54 may also contain data transfer interface 92 that transfers stored Leq and statistical information to an analysis unit (e.g., 14 of FIG. 1). Interface 92 may be used to control monitoring unit 50 remotely. Communication path 16, FIG. 1, may be a physical bus, or may be a wireless link.

Power supply section 56 contains power control circuit 94, which stabilizes power received from rechargeable battery 96 and supplies power to analog section 52 and processing and control section 54 via power connectors 98 and 100, respectively. Solar panel 102 extends the life of battery 96 by recharging it when sufficient light is available.

Figure 4:
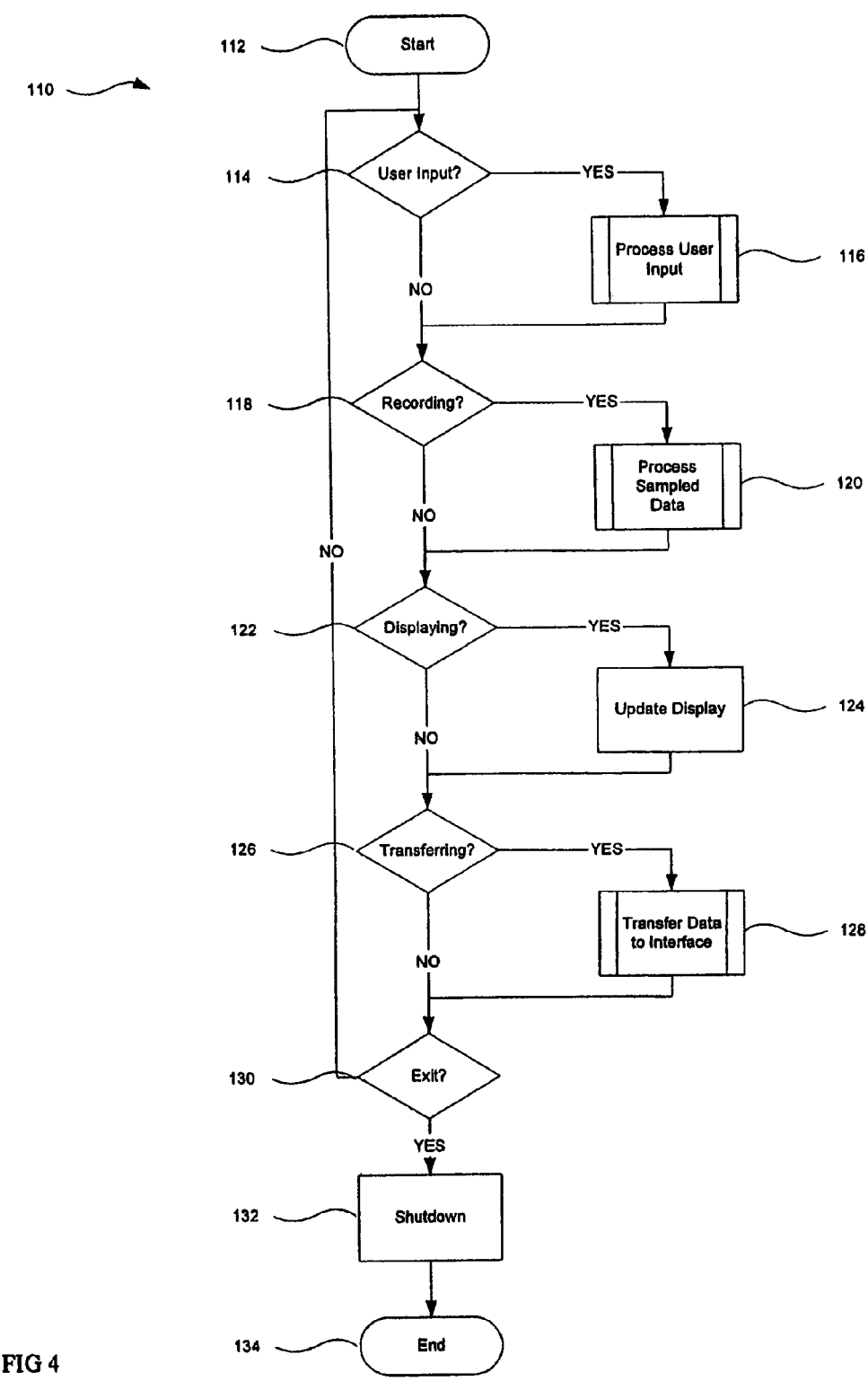
FIG. 4 shows a flow chart illustrating one process for controlling the monitoring unit of FIG. 1.
Figure 5:
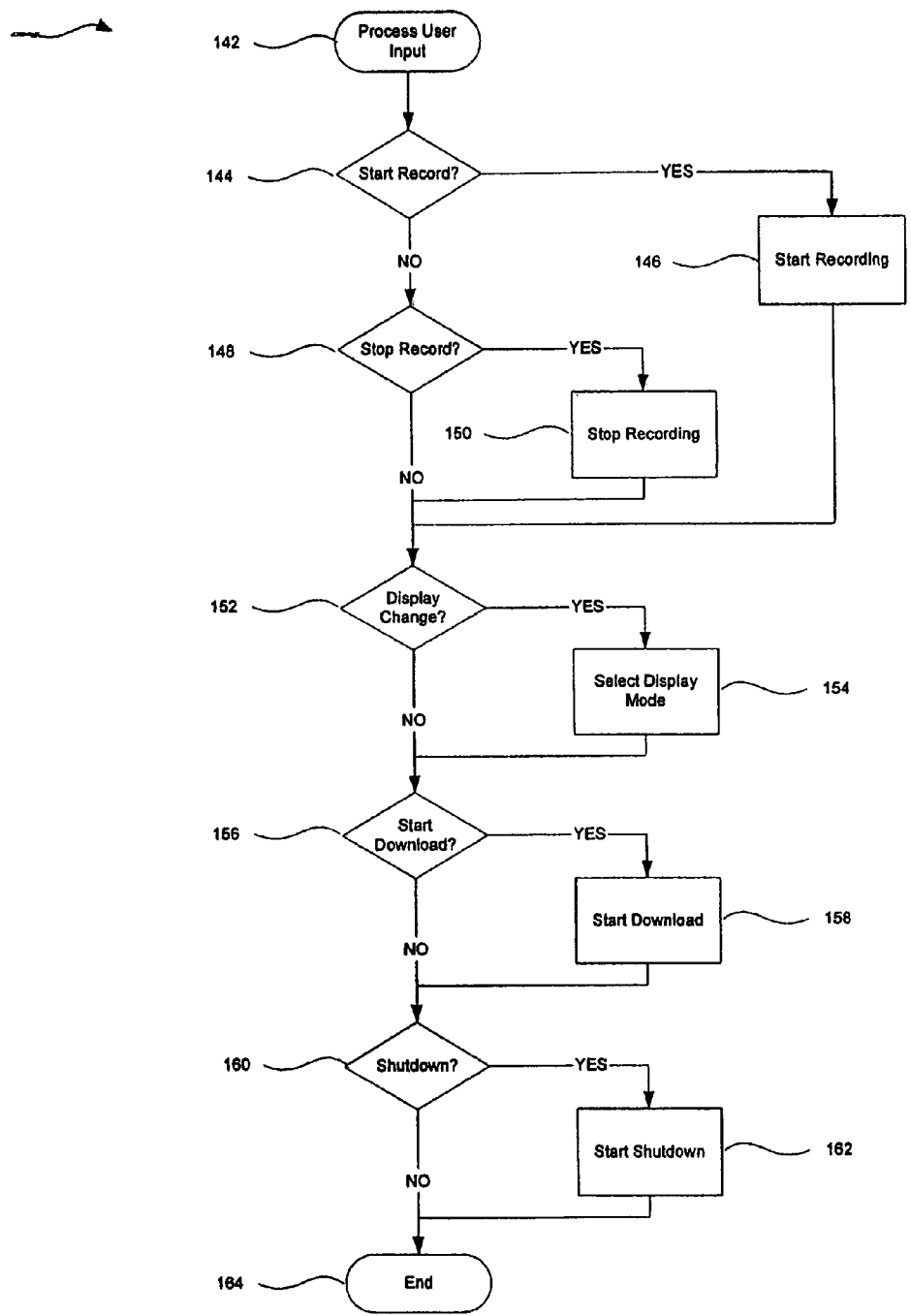
FIG. 5 shows a flow chart illustrating one sub-process for handling user input.
Figure 6:
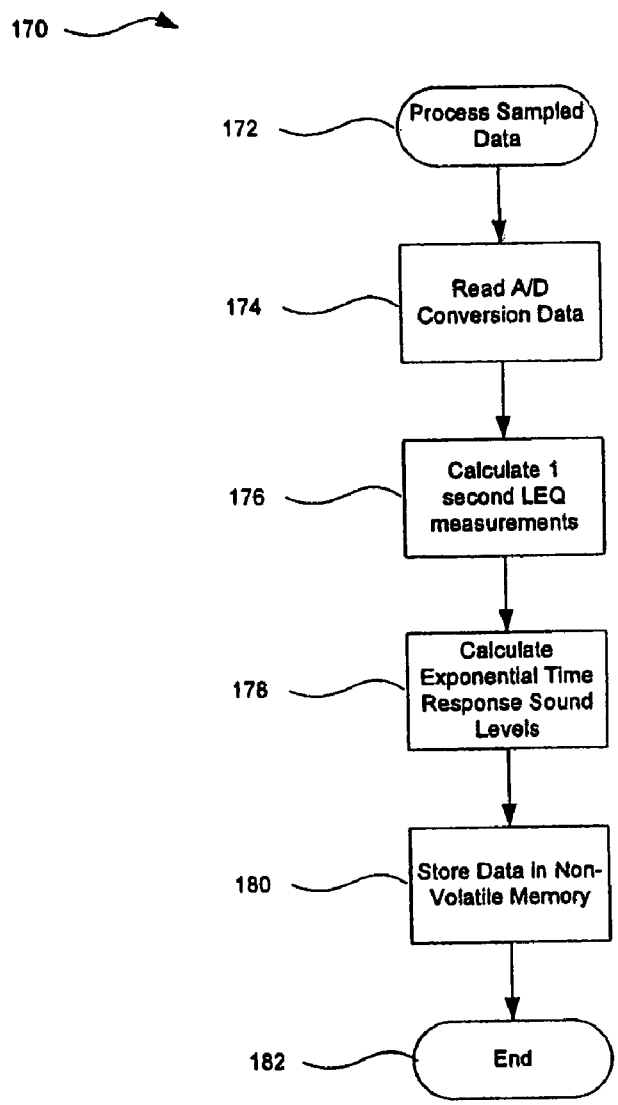
FIG. 6 shows a flow chart illustrating one sub-process for processing sampled data.
Figure 7:
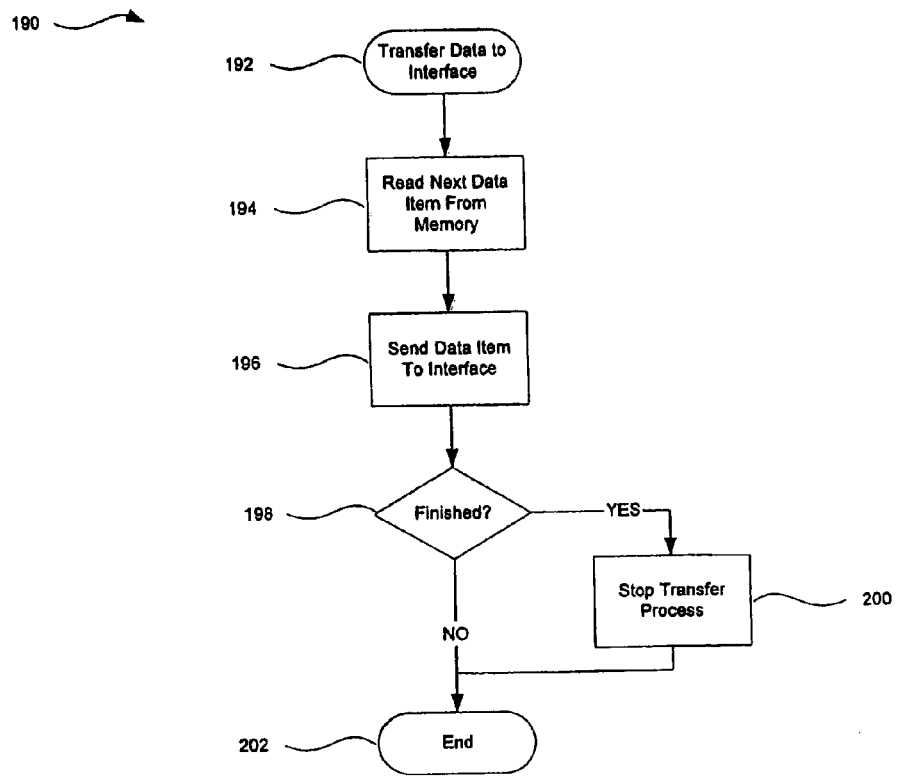
FIG. 7 shows a flow chart illustrating one sub-process for controlling data transfer.

FIG. 4 shows a flow chart illustrating process 110 for controlling the portable noise monitoring unit 20 of FIG. 2. Process 110 illustrates an outer control loop of software used with processor 86, FIG. 3. FIGS. 5, 6 and 7 illustrate sub-processes 140, 170 and 190, respectively, referenced in process 110.

Process 110 begins at step 112, at which point the unit is powered on and initialized. Steps 114 to 130 are performed continuously until the user elects to shut the system off. Process 110 continues with step 114.

Step 114 is a decision. If there is input from the user, process 110 continues with step 116; otherwise process 110 continues with step 118. Step 116 is the execution of sub-process 140, shown in FIG. 5. Sub-process 140 returns to step 118 upon completion.

Step 118 is a decision. If the user has elected to record, process 110 continues with step 120; otherwise process 110 continues with step 122. Step 120 is the execution of sub-process 170, shown in FIG. 6. Sub-process 170 returns to step 122 upon completion.

Step 122 is a decision. If the user has selected a display that shows measurement values, process 110 continues with step 124; otherwise process 110 continues with step 126. Step 124 updates the display with the latest measurement values. Process 110 continues with step 126.

Step 126 is a decision. If the user has elected to transfer data to an analysis unit, process 110 continues with step 128; otherwise process 110 continues with step 130. Step 128 is the execution of sub-process 190, shown in FIG. 7. Sub-process 190 returns to step 130 upon completion.

Step 130 is a decision. If the user has elected to exit, process 110 continues with step 132; otherwise process 110 continues with step 114.

Step 132 performs shutdown operations. Process 110 terminates at step 134.

FIG. 5 shows a flow chart illustrating sub-process 140. Sub-process 140 handles user input. Sub-process 140 starts at step 142, and continues with step 144.

Step 144 is a decision. If the user has elected to start recording equivalent noise level ("Leq") data, sub-process 140 continues with step 146; otherwise sub-process 140 continues with step 148. Step 146 initializes the recording mechanism, and sets a flag to cause sub-process 170 execution from process 110. Sub-process 140 continues with step 152.

Step 148 is a decision. If the user has elected to stop recording Leq data, sub-process 140 continues with step 150; otherwise sub-process 140 continues with step 152. Step 150 terminates recording. Sub-process 140 continues with step 152.

Step 152 is a decision. If the user has selected a different display, sub-process 140 continues with step 154; otherwise sub-process 140 continues with step 156. Step 154 changes the display contents, and selects the appropriate screen update mechanism. Sub-process 140 continues with step 156.

Step 156 is a decision. If the user has elected to start downloading recorded data, sub-process 140 continues with step 158; otherwise sub-process 140 continues with step 160. Step 158 initializes the download sequence and sets a transfer flag to cause sub-process 190 execution in process 110. Sub-process 140 continues with step 160.

Step 160 is a decision. If the user has elected to shut the unit down, sub-process 140 continues with step 162; otherwise sub-process 140 terminates at step 164. Step 162 sets the Exit flag and sub-process 140 terminates at step 164.

FIG. 6 shows a flow chart illustrating sub-process 170, which processes the sampled sound level signal information. Sub-process 170 starts at step 172, and continues with step 174.

Step 174 converts analog signals 78 and 82 of FIG. 3 to digitized data using analog-to-digital converter 84 of FIG. 3. Sub-process 170 continues with step 176.

Step 176 calculates the 1-second Leq values from the digitized data. Sub-process 170 continues with step 178.

Step 178 calculates the hourly exponential time response values from the 1-second Leq values. Sub-process 170 continues with step 180.

Step 180 stores the calculated values in non-volatile data memory 88 of FIG. 2. Sub-process 170 terminates at step 182.

FIG. 7 shows a flow chart illustrating sub-process 190, which transfers stored data to data transfer interface 92 of FIG. 3. Sub-process 190 starts at step 192, and continues with step 194.

Step 194 reads the next data item from the non-volatile data memory 88 of FIG. 2. Sub-process 190 continues with step 196.

Step 196 transfers the data to data transfer interface 92 of FIG. 3. Sub-process 190 continues with step 198.

Step 198 is a decision. If the last data item from memory was transferred, sub-process 190 continues with step 200; otherwise sub-process 190 terminates at step 202.

Step 200 stops the transfer process. Sub-process 190 terminates at step 202.

Those skilled in the art will appreciate that variations from the specified embodiments disclosed above are contemplated herein. The description should not be restricted to the above embodiments, but should be measured by the following claims.

What is claimed is:

1. A system for unattended noise monitoring, comprising:
   an analog section for detecting noise and for simultaneously weighting the noise through A- and C-frequency filters in accordance with national and international noise measurement standards;
   a processing section for converting the detected and weighted noise to one or more Leq data;
   a communications interface for remote control of, and data communication with, the processing section; and
   an analysis unit for displaying, processing and detecting events in the Leq data.

2. A system of claim 1, the processing section comprising firmware to control the noise monitoring unit.

3. A system of claim 1, the analog section further comprising logarithmic amplifiers for converting the detected and weighted noise to a range suitable for analog to digital conversion.

4. A system of claim 3, the processing section further comprising an analog to digital converter.

5. A system of claim 1, further comprising a display for displaying data from the processing section, the display being in communication with the processor.

6. A system of claim 1, further comprising a keypad for inputting data to the processing section, the keypad being in communication with the processor.

7. A system of claim 1, the processing section generating one or more of maximum, minimum, $1/10$th percentile, $1/50$th percentile, $1/90$th percentile Leq data.

8. A system of claim 1, the processing section comprising memory for storing tip to about two weeks of the data.

9. A system of claim 1, further comprising a portable power supply for powering the sections.

10. A system of claim 9, the power supply comprising a rechargeable battery.

11. A system of claim 9, the power supply comprising solar power converters.

12. A system of claim 1, wherein the data comprises one-second equivalent averages of the noise.

13. A method for environmental noise level monitoring, comprising the steps of:
   detecting and converting sound waves into first and second identical analog electrical signals;
   filtering the first signal for A-weighted information and generating a third signal representing an envelope of the filtered A-weighted signal;
   filtering the second signal for C-weighted information and generating a fourth signal representing an envelope of the C-weighted filtered signal;
   compressing the third and fourth signals using logarithmic amplifiers into a range of logarithmic signals suitable for digitization;
   converting the logarithmic signals into digital data using an analog-to-digital converter;
   calculating 1-second Leq values for the digital data;
   calculating hourly averages of the Leq values;
   calculating one or more of maximum, minimum, $1/10$th percentile, $1/50$th percentile, $1/90$th percentile Leq and time-weighted data; and
   storing the Leq and statistical data in non-volatile memory.

14. A method of claim 13, further comprising
   transferring stored data from the non-volatile memory to a noise analysis unit;
   displaying the transferred data in graphical form at the noise analysis unit;
   processing the transferred data to produce statistical information; and
   classifying noise events in the transferred data.

15. A software product having instructions, wherein the instructions, when executed by a computer, provide for environmental noise level analysis, comprising:
   Instructions for downloading Leq and statistical environmental noise data from a system for unattended noise monitoring;
   Instructions for storing the Leq and statistical environmental noise data on a PC as a text file;
   Instructions for displaying the Leq and statistical environmental noise data; and
   Instructions for isolating sound level events over a first user-defined threshold;
   Instructions for isolating a minimum time over a second user-defined threshold level, and
   Instructions for isolating a minimum LAeq to LCeq ratio.

16. The software product of claim 15, wherein the instructions for displaying the Leq and statistical data comprise:
   instructions for graphically displaying 1-second Leq sound data over a user-selected time period, and
   instructions for creating tables showing hourly and daily summaries of the 1-second Leq data.

17. The software product of claim 16, farther comprising instructions for zooming in to a user-selected time period in response to a user request.

18. The software product of claim 15 wherein the instructions for displaying the Leq and statistical data comprise instructions for graphically displaying 1-second, 10-second, 1-minute, 1-hour and 1-day averaging times for a user-selected time period.

19. The software product of claim 15 wherein the instructions for displaying the Leq and statistical data comprise instructions for displaying start time, end time, duration, Lmin, L90, L50, L10, Lmax, LAeq and LCeq for a user-selected time period.

* * * * *